April 24, 1962    M. L. ELLIS    3,031,218
SHEAR PIN ROPE SOCKET
Filed Dec. 9, 1958    2 Sheets-Sheet 1

Morris L. Ellis
INVENTOR.

BY *Clarence A. O'Brien*
*and Harvey B. Jacobson*
Attorneys

April 24, 1962 M. L. ELLIS 3,031,218
SHEAR PIN ROPE SOCKET
Filed Dec. 9, 1958 2 Sheets-Sheet 2
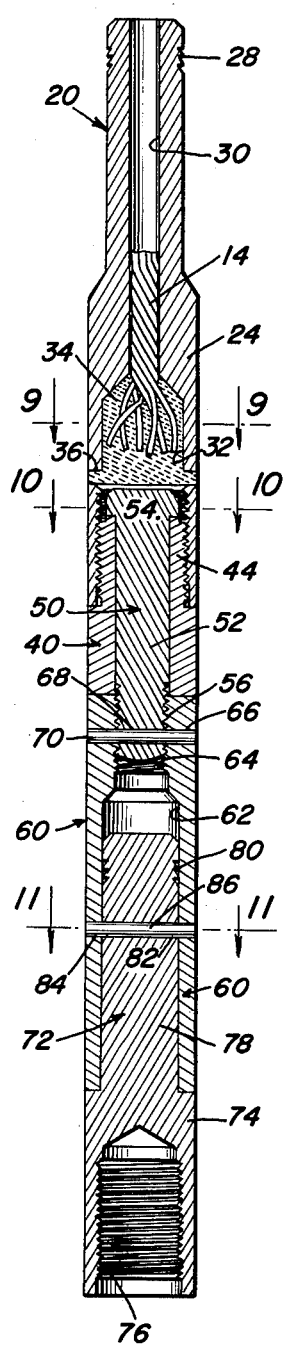
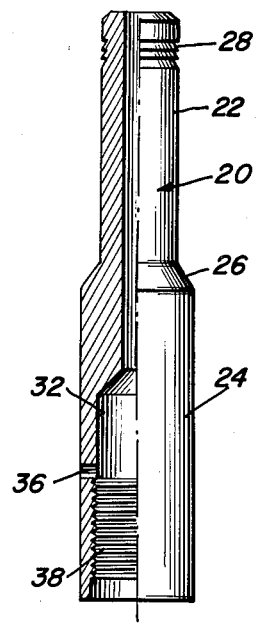
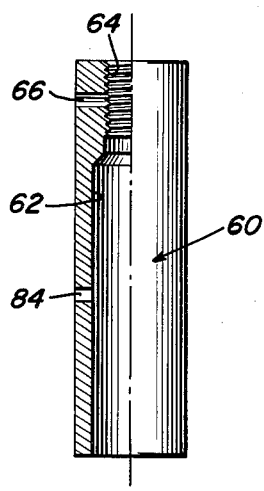
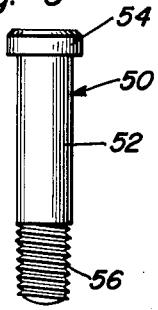
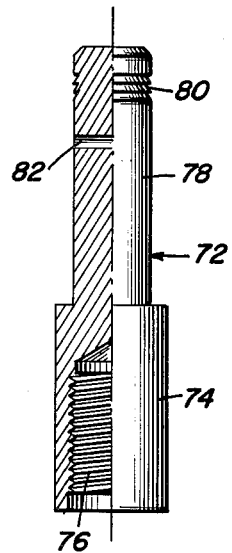
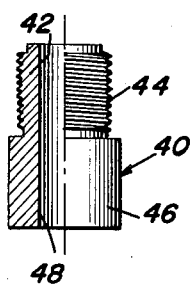
Morris L. Ellis
INVENTOR.

United States Patent Office 3,031,218
Patented Apr. 24, 1962

3,031,218
SHEAR PIN ROPE SOCKET
Morris L. Ellis, Box 442, Midland, Tex.
Filed Dec. 9, 1958, Ser. No. 779,198
2 Claims. (Cl. 287—91)

This invention comprises a novel and useful shear pin rope socket and more particularly relates to a releasable swivel connection for wire lines and cable strings of the type commonly employed for well drilling operations wherein the swivel connection will rupture a shear pin and become disengaged when a load is imposed of a predetermined value less than that which will endanger the wire line or cable.

The primary purpose of this invention is to provide a cable connection for wire lines, cables and the like which will operate as a safety device to prevent danger of breaking the cable or wire line by the imposition of excessive loads thereon.

A further object of the invention is to provide an overload disengageable connection for use with wire lines and the like which when the connection has separated under an excessive load will provide a convenient gripping surface upon the lower portion of the same whereby the lower portion of the connection and the attached sucker rod or tool string may be easily recovered by conventional fishing methods.

Still another object of the invention is to provide a seperable connection in accordance with the foregoing objects which shall be of simple and inexpensive construction, yet readily assembled and dependable in its operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a vertical longitudinal central sectional view taken upon an enlarged scale substantially upon the plane indicated by the section line 3—3 of FIGURE 1 and showing in particular the position of the parts and their association with each other when the rope socket is in operative position;

FIGURES 4–8 are respectively elevational views, parts being broken away and shown in section of the various elements forming the components of the novel shear pin rope socket in accordance with this invention; and, FIGURES 9–11 are horizontal sectional views taken upon an enlarged scale substantially upon the planes indicated by the section lines 9—9, 10—10 and 11—11 respectively of FIGURE 3.

Figure 1:
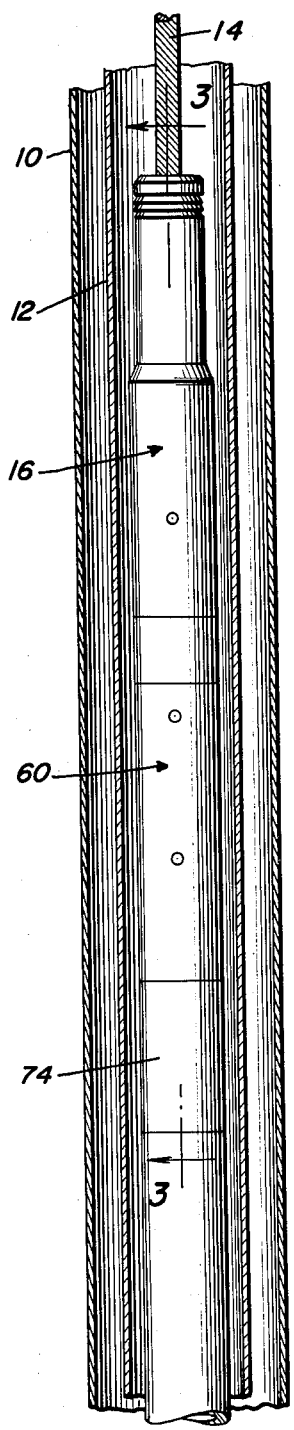
FIGURE 1 is a view in vertical section through a portion of a well casing and a tubing string therein and showing the disposition of the present invention therein, the detachable shear pin rope socket being shown in elevation therein, parts being broken away and omitted.
Figure 2:
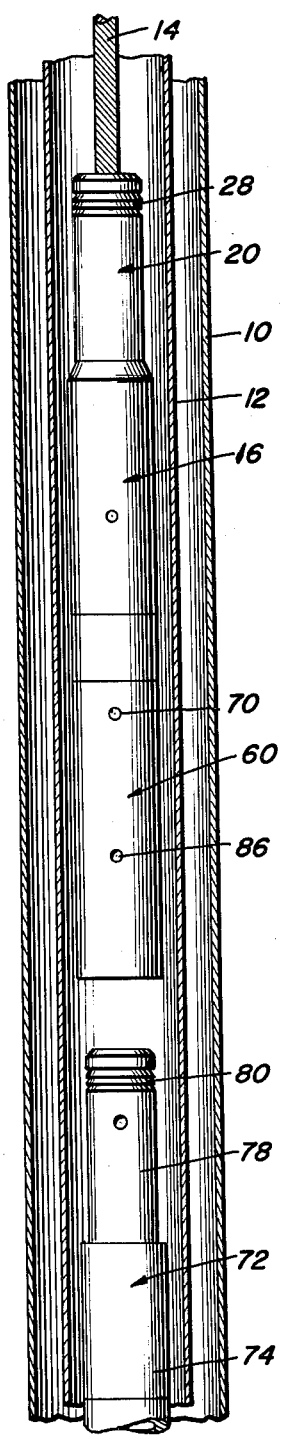
FIGURE 2 is a view similar to FIGURE 1 but showing the position of the parts of the connection after the connecting pin therein has been sheared and the lower portion of the connection including the sucker rod string attached thereto has become separated from the upper portion of the connection which remains connected to the cable.
Figure 9:
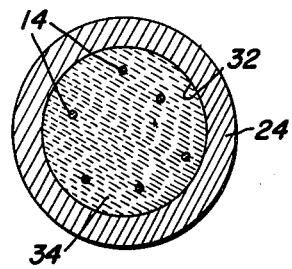
Figure 10:
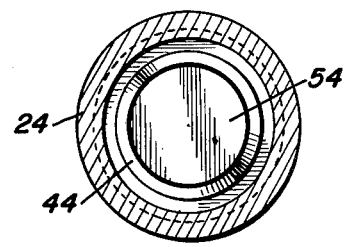
Figure 11:
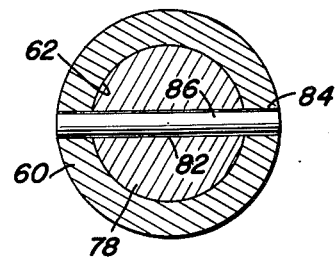

Reference is now made first to FIGURES 1 and 2 wherein it will be seen that the numeral 10 designates a portion of a well casing which is disposed in a well bore and in which is received a string of tubing as at 12. Shown at 14 is the lower portion of a cable or rope to which is secured the shear pin rope socket or detachable connection of the present invention designated generally by the numeral 16, it being understood that the lower portion of this connection is adapted to be secured to and support the upper end of a sucker rod string, or some other string to be reciprocated in the tubing, the details of which have not been illustrated in these drawings as forming no part of the present invention.

In reciprocating a sucker rod or other string in deep wells, it is obvious that very heavy strains, sometimes amounting to thousands of pounds are imposed upon the cable or rope 14. When the string encounters some unusual obstruction and becomes stuck, a sufficient increase in force applied to the cable will likely break the same. The presence of the lower portion of the broken cable in the well bore renders difficult any subsequent fishing operations desired for recovering the string or fish which is stuck in the lower portion of the well bore.

It is a purpose of the present invention, therefore, to provide a detachable coupling by which the cable may be secured to the string so that when an undue pressure is applied to the cable, separation will take place in the detachable coupling itself rather than result in a breaking of the cable. This will avoid the obstruction of the lower portion of the cable in the tubing which would thereby tend to prevent the effectiveness of the fishing operation.

Referring now especially to FIGURE 3 in conjunction with FIGURES 4–8, it will be observed that the detachable connection or the shear pin rope socket 16 consists of a number of component elements associated together in a novel manner. These elements include a rope socket body indicated generally at 20 and which comprises the uppermost element of the combination. The rope body socket body has an upper cylindrical portion 22 together with a diametrically enlarged lower portion 24 joining the upper portion as by conical section 26. Upon the uppermost portion 22 there is provided a series of annular ribs 28 constituting a ridged surface which will facilitate engagement of the same by a suitable fishing tool if necessary. The rope socket body 20 is provided with a central bore 30 extending therethrough, the lower end of this bore being diametrically enlarged as at 32 to provide a chamber in which the lower end of the cable 14 is received and is embedded in a mass of babbitt as at 34 or other suitable sealing and anchoring material for the same. Suitable apertures 36 extend diametrically through the side walls of the enlarged portion 32 to permit the discharge of the molten babbitt therefrom to thus indicate that the chamber has been completely filled during the babbitting operation. Below the apertures 36, the lower portion of the chamber 32 is internally threaded as at 38 for the purpose of receiving detachably therein a bushing or swivel collar designated generally by the numeral 40.

As shown in FIGURES 3 and 6, this latter member has an upstanding neck portion 42 which is externally threaded as at 44 for reception in the threaded extremity 38 of the rope socket body 20. The lower portion of the swivel collar 40 is diametrically enlarged to provide a cylindrical body as at 46 whose external diameter and circumference are such as to form a continuation of that of the lower end of the rope socket body.

An axial bore 48 extends entirely through swivel collar 40 and slidably and rotatably receives therein a swivel bolt indicated generally at 50. This bolt has a shank portion 52 which is snugly slidable and turnable in the bore 48, together with an enlarged head portion 54 which rests upon the upper end of the diametrically reduced neck portion 42 of the swivel collar 40. The externally threaded lower portion 56 of the bolt projects downwardly below the swivel collar.

Disposed immediately below the swivel collar 40 is a cylindrical swivel body designated generally by the numeral 60, see FIGURE 7. This body is of uniform external diameter, and its exterior surface forms a continuation of those of the rope socket body and the swivel collar as will be apparent from FIGURE 3.

Disposed axially in the body 60 and opening upwardly from the lower end thereof is a relatively large chamber or bore 62 which at its upper end terminates in a diametrically reduced internally threaded bore 64 which receives therein the lower externally threaded end 56 of the swivel bolt 50. A diametrically extending bore 66 in the wall of the body 60 extends diametrically through the upper portion of this body and through the diametrically reduced internally threaded bore 64 and likewise passes through a corresponding diametrical bore 68, see FIGURE 3, in the externally threaded lower portion 56 of the swivel bolt 50. A shear pin 70 is inserted through the bores 66 and 68 in order to secure the swivel body 60 to the shear pin bolt and retain the same in assembled relation.

A sucker rod box designated generally by the numeral 72 is provided to connect the swivel body 60 with a sucker rod or other string, not shown. This sucker rod box consists of a cylindrical lower portion 74 having an internally threaded bore 76 therein. This bore is adapted to receive the threaded pin comprising the upper end of a sucker rod string or other string by which the string is supported through this connection from the cable 14. Above the body portion 74, the sucker rod box 72 is provided with a diametrically reduced mandrel or upper end as at 78 provided upon the upper portion of the exterior surface with a series of annular ridges or ribs as at 80, adapted to facilitate engagement of the same by a fishing tool when the sucker rod box has been separated from the rest of the connection as indicated in FIGURE 2.

Extending diametrically through the neck or mandrel portion 78 is a transverse bore 82 which is adapted to align with a corresponding transverse bore 84 disposed in the swivel body 60 in order that a shear pin 86 may be disposed through these aligned bores as shown in FIGURE 3. This shear pin is of any desired strength in accordance with the strain at which it is desired to cause the connection to disengage or disassemble and thus prevent injury to the wire line 14.

From the foregoing, it is believed that the operation of the device will now be readily understood. The lower end of the cable or wire line 14 is disposed through the bore 30 into the chamber 32, is expanded therein, as shown in FIGURE 3 and then is retained and sealed therein by pouring molten babbitt 34 until this chamber is filled including the diametrical or radial vents 36 which by the flow of the molten material therefrom effectively indicates the chamber is filled with the sealing material.

Thereafter, the swivel bolt 50 is disposed in the swivel collar 40, and the latter is then screwed into the bore 38 at the lower portion of the bore 32 of the rope socket body 20.

The swivel body 60 is then screwed by its neck portion 64 upon the lower end of the bolt 50, and is then locked thereon by inserting the pin 70 through the aligned bores 66 and 68 as shown in FIGURE 3. Finally, the sucker rod box 72 has its mandrel or neck portion 78 inserted into the bore 62 of the swivel body 60, and upon alignment of the apertures 84 of the swivel body and 82 of the sucker rod box, the shear pin 86 is placed in position. Thereafter, the sucker rod box has its portion 76 engaged with the upper threaded pin of a sucker rod string or other string with which the device is to be associated.

The device is then inserted in the tubing string 12 or in a well bore as desired and is operated in accordance with conventional practice. When too great a load is imposed upon the cable 14, for which the shear pin 86 is designed, the latter will shear permitting the sucker rod string and the sucker rod box 72 to separate from the rest of the rope pin socket and drop downwardly in the well bore from the latter as shown in FIGURE 2. When this condition occurs, the cable 14 can be employed to withdraw the upper portion of the rope socket from the well bore, a suitable fishing tool may be lowered and engaged upon the neck portion 80 of the sucker rod box whereby the latter and the associated sucker rod or other string may be withdrawn from the well bore and recovered.

As will be understood, various shear pins 86 of different strengths will be employed depending upon the force which must be resisted during the operation of the wire line or cable 14. Further, as the latter becomes old and worn, shear pins of lesser strength can be employed as the over-all tensile strength of the wire line or cable has deteriorated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A shear pin rope socket comprising a rope socket body having means for bondingly securing one end of a rope in the upper end of said body, a swivel bushing threadedly and fixedly engaged in the lower end of said rope socket body, a swivel bolt rotatably mounted in said swivel bushing and projecting downwardly therefrom and from said body, a swivel body secured at its upper end to said swivel bolt and projecting downwardly from the latter and having a chamber opening at its lower end, a sucker rod box having a stem at its upper end received in said swivel body chamber, a shear pin connecting said sucker rod box stem and said swivel body, said rope socket body having an enlarged bore in the lower portion thereof, said securing means being disposed in said enlarged bore, said swivel bolt having a head in said enlarged bore disposed between said swivel bushing and said securing means.

2. A shear pin rope socket comprising a rope socket body having means for bondingly securing one end of a rope in the upper end of said body, a swivel bushing threadedly and fixedly engaged in the lower end of said rope socket body, a swivel bolt rotatably mounted in said swivel bushing and projecting downwardly therefrom and from said body, a swivel body secured at its upper end to said swivel bolt and projecting downwardly from the latter and having a chamber opening at its lower end, a sucker rod box having a stem at its upper end received in said swivel body chamber, a shear pin connecting said sucker rod box stem and said swivel body, annular ribs on the exterior of said stem of said sucker rod box.

References Cited in the file of this patent
UNITED STATES PATENTS

| | | |
|---|---|---|
| 740,026 | Krohn | Sept. 29, 1903 |
| 1,191,250 | Walker | July 19, 1916 |
| 1,192,252 | Wilt | July 25, 1916 |
| 1,413,487 | Northrup | Apr. 18, 1922 |
| 1,471,105 | Cox | Oct. 16, 1923 |
| 1,519,445 | Finney | Dec. 16, 1924 |
| 1,678,706 | Neilson | July 31, 1928 |
| 2,321,215 | Lee | June 8, 1943 |
| 2,565,547 | Collins | Aug. 28, 1951 |
| 2,671,640 | Baker | Mar. 9, 1954 |